UNITED STATES PATENT OFFICE.

ARTHUR N. HOOD, OF NEWTON, AND JOHN T. NIGHTINGALE, OF BOSTON, MASSACHUSETTS, AND FRANK R. LELAND AND THEODORE W. DIKE, OF NEW WESTMINSTER, BRITISH COLUMBIA, CANADA, ASSIGNORS, BY MESNE ASSIGNMENTS, TO LAMINATED MATERIALS COMPANY, LIMITED, OF NEW WESTMINSTER, BRITISH COLUMBIA, CANADA, A CORPORATION OF BRITISH COLUMBIA, CANADA.

METHOD OF MAKING PLYWOOD.

1,369,743.  Specification of Letters Patent.  Patented Feb. 22, 1921.

No Drawing.  Application filed April 5, 1920.  Serial No. 371,457.

*To all whom it may concern:*

Be it known that we, ARTHUR N. HOOD, a citizen of the United States, residing at Newton, county of Middlesex, State of Massachusetts, JOHN T. NIGHTINGALE, a citizen of the United States, residing at Boston, county of Suffolk, State of Massachusetts, and FRANK R. LELAND and THEODORE W. DIKE, both citizens of the United States, residing at New Westminster, British Columbia, Canada, have invented certain new and Improved Methods of Making Plywood, of which the following is a specification.

The present invention relates to the manufacture of plywood which is composed of a plurality of superposed plies of wood veneer laid with the grain of adjacent plies crosswise to each other, the whole being secured together by suitable adhesive. Broadly speaking, the objects of the invention are to improve the methods of manufacture of plywood when practised commercially on a large scale and to produce more economically a better and more durable product. The other objects of the invention and the particular results obtained are fully explained hereafter. The hereindescribed novel method is particularly intended for use in the production of so-called waterproof plywood in which the plies are held together by an insoluble albuminous aqueous cement containing as its principal adhesive agent, blood, albumen or casein. For reasons which will be apparent, the method is particularly applicable to the manufacture of plywood from green black cottonwood, but it may be used with other suitable woods and is not limited to use with a particular wood.

A large proportion of the natural moisture of green wood must be removed before it is fit for use. In drying, re-adjustments of form and structure occur which manifest themselves by shrinkage and development of unsatisfied strains. These changes and tendencies to change have entailed serious difficulties in the manufacture of plywood, these difficulties being magnified by the conflict of forces arising from the strains due to the superimposed plies which run in different directions. Owing to this, the methods of plywood manufacture hitherto employed have produced a product limited in usefulness and durability because the moisture changes occurring in the product subsequent to the manufacture tend to warp, check and shorten the life of the material in use.

Shrinkage of veneer cut by a rotary lathe takes place in three directions, (a) tangential shrinkage which is crosswise of the ply, (b) lengthwise shrinkage which is lengthwise of the log and (c) radial shrinkage which is in a line perpendicular to the sur face of the ply. In drying green black cottonwood, the tangential shrinkage is about eight (8) per cent., while the lengthwise shrinkage is hardly observable, and the radial shrinkage is only three (3) per cent. or four (4) per cent. of the thickness of the ply. Radial shrinkage produces no strains in plywood, but the warping, checking and unsatisfied strains in plywood result either from tangential shrinkage or swelling or from a combination of the two.

It has been determined by exhaustive research that the moisture content of green wood exists in two dissimilar forms, (a) free moisture which occupies cavities within and between the cells and (b) moisture in the cell walls themselves. The first kind of moisture is commonly referred to as free moisture, and the second kind as fiber saturation moisture. The fiber saturation moisture is substantially constant in all woods and varies from twenty-five (25) per cent. to thirty (30) per cent. of the weight of the dry wood, while the free moisture varies greatly with the kind and condition of wood. It has further been determined that when wood is dried, none of the fiber saturation moisture is dissipated until all the free moisture has been removed, and that no appreciable shrinkage takes place during the removal of the free moisture. All the shrinkage incident to drying wood and the consequent strains occur during the removal of the fiber saturation moisture and conversely the free moisture may all be removed without structural changes occurring in the wood. In the combined presence of heat, moisture and pressure, the fibers become plastic and permanent changes in form may be produced.

The albuminous adhesives employed have a large water content, being preferably from sixty-six (66) per cent. to ninety (90) per cent. to obtain the best and most economical results. An adhesive which has a high percentage of moisture can be used most economically, and this can be done with our hereindescribed novel process but could not with the processes which have been employed in the past.

Two processes of making plywood have heretofore been practiced, namely, the so-called cold process and the so-called hot process. In the cold process, the plies of wood are first dried and shrunk, are then spread with glue, and immediately pressed in a cold press. This pressing step in the cold process has to be performed with the least possible loss of time after the application of the glue, since otherwise the moisture in the glue causes swelling and the attendant difficulties. This process results in loss of surface from shrinkage of about eight (8) per cent., and great difficulties during manufacture caused by the fact the moisture in the glue swells the previously dried wood causing warping, checking, poor adhesion, etc. Heavy loss is also experienced during manufacture because the thin plies which have been fully dried are brittle and split easily when being handled. In the hot process, the plies in the green wet undried state are spread with adhesive and superposed, and are then subjected to heat and pressure sufficient to set the glue. The moisture in excess of the amount desired in the finished product is expelled during this step or by subsequent drying. This process has the great advantage that it makes possible the use of certain albumen glues which require heat to set them and render them waterproof. The great objection to the hot process is the poor quality of the product on account of cracks, checks, unstuck places, and warped panels. The process is also slow and expensive, because the panels must remain in the plate presses for relatively long periods.

All of the preceding facts are essential to an understanding of the novel process now to be described.

The novel process is a hot process having some of the desirable features of the cold process, and makes it possible to construct perfect panels directly out of green wood such as black cottonwood having unusually high moisture content without loss of area, with a minimum checking, warping and internal strains. Broadly stated, the essential feature of the hereindescribed novel process is the removal in a hot plate press of a remaining portion of the free moisture together with a portion of the fiber saturation moisture, the other portion of the moisture but none of the fiber saturation moisture having been removed previously and in any desired manner.

In practising the invention, the plies are prepared in the ordinary manner, being cut from the green or watersoaked log by means of a veneer lathe. The plies are trimmed to proper size and coated with the adhesive. No expansion of the wood results from the application of the glue, because the wood is already saturated and fully expanded. The steps described up to this point are not novel.

The next step is the cooking or heating of the panels to being the setting of the glue and the expulsion of the surplus moisture. This step is performed in heated hydraulic plate presses. The panels may be pressed singly but preferably in groups of from three to ten. The temperature should not be less than 212° Fahr. and the pressure in excess of that due to the heat. Where a single panel is being pressed, a satisfactory temperature is slightly more than 212°, the pressure approximately forty (40) pounds per square inch and the time from five to twenty-five minutes depending upon the thickness of the panel and the character of the wood. When a group of panels from two to four inches thick in the aggregate are cooked simultaneously, the temperature is conveniently about 250° Fahr. and the time about forty-five minutes. After the cooking is complete, the material is cooled to a temperature below 212° Fahr. before the pressure is released to prevent injury due to the expansion of the steam contained in the pores of the wood.

Both the temperatures and pressures can be varied considerably according to conditions, but the pressure must always be in excess of that produced by the heat or blistering will result. The hydraulic pressure may be varied widely. Wet wood requires less pressure than dry wood and wood with a fine fibrous surface requires less pressure than wood with a coarse surface. Likewise, a cement of low viscosity requires less pressure than a thick viscous cement. High pressure compresses the wood and densifies and improves the quality.

During this cooking step, about twenty-five (25) per cent. of the total moisture content can be removed. This is about all the moisture which can be efficiently removed by this step without doing injury to the product. This amount of moisture comes off rapidly but without injury to the fiber, and the wood is thoroughly heated and the cement is set sufficiently to hold the plies together.

The next step is the drying of the panel to a point preferably just short of that at which the fiber saturation moisture would begin to be driven off. This is best performed by passing the panels through a mechanical drier in which the humidity conditions can be exactly regulated so that exactly by cutting the veneer for the plies slightly thicker. In the case of certain kinds of woods, the final product is much improved by employing a relatively high hydraulic pressure during repressing to densify it considerably, but in any case the elimination of tangential shrinkage in the manner described, produces a product altogether different and better than any which had heretofore been produced.

What we claim as our invention and desire to secure by Letters Patent is:—

1. The method of making plywood which consists in removing a remainder of the free moisture and a part of the fiber saturation moisture while the plies are subjected to heat in a plate press and to pressure sufficient to prevent tangential shrinkage, the other part of the free moisture having been previously removed.

2. The method of making plywood which consists in placing in a hot plate press assembled cemented plies of wood from which a portion of the free moisture has been removed, and subjecting them to heat sufficient to soften and set the fiber structure and drive off the remainder of the free moisture and a portion of the fiber saturation moisture and to pressure sufficient to prevent tangential shrinkage, the other part of the free moisture having been previously removed.

3. The method of making plywood which includes subjecting the assembled cemented plies to heat and pressure in a plate press to remove part of the free moisture and set the cement somewhat, then drying the panels to remove more of the free moisture, and finally removing the remainder of the free moisture and a part of the fiber saturation moisture while the panel is subjected to heat and pressure in a plate press.

4. The method of making plywood which consists in extracting the moisture from the panel in three stages, the first and the last being performed while the panel is subjected to heat and pressure in a plate press, the moisture removed by the first two stages being less than the amount of the free moisture in the panel.

5. The method of making plywood which includes subjecting the assembled cemented plies to heat and pressure in a plate press to remove part of the free moisture and set the cement somewhat, then drying the panels to remove more of the free moisture, and finally removing the remainder of the free moisture and a part of the fiber saturation moisture by subjecting the panel in a plate press to heat and pressure sufficient to densify it.

6. The method of making plywood which consists in subjecting panels which have been assembled from plies of wet veneer spread with an aqueous cement to heat and pressure in a hydraulic plate press until the cement has set somewhat and some of the free moisture has been driven off, then drying the panels to a point short of the fiber saturation point, and again pressing the panels in a plate press under pressure sufficient to prevent tangential shrinkage and to remove a predetermined amount of the fiber saturation moisture.

7. The method of making plywood which consists in subjecting plywood which has been assembled from plies of wet veneer spread with cement to a temperature of more than 212° Fahr. and a pressure of more than twenty-five (25) pounds to the square inch to remove part of the free moisture, then drying the plywood at substantially atmospheric pressure to remove more of the free moisture and then subjecting it to a temperature of upward of 230° Fahr. and a pressure of more than fifteen (15) pounds to the square inch until all of the free moisture and part of the fiber saturation moisture has been driven off.

8. The method of making plywood which consists in subjecting the plywood which has been assembled from plies of wet veneer spread with cement to a temperature of more than 212° Fahr. and a pressure greater than that produced by the heat until a part of the free moisture has been removed, allowing the plywood to cool below 212° while still under pressure greater than that due to the heat, drying the plywood at substantially atmospheric pressure to remove more of the free moisture, and again subjecting it to heat and pressure greater than that due to the heat until the remainder of the free moisture, and part of the fiber saturation moisture has been driven off.

9. The method of making plywood which consists in subjecting the plywood which has been assembled from plies of wet veneer spread with cement to a temperature of more than 212° Fahr. and a pressure greater than that produced by the heat until a part of the free moisture has been removed, removing the material from the press and allowing it to remain in piles to equalize the moisture, then drying the plywood to remove more of the free moisture, and finally subjecting it to heat and pressure to densify it and remove the remainder of the free moisture and part of the fiber saturation moisture.

10. The method of making plywood which includes subjecting the plywood which has been assembled from plies of wet veneer spread with cement to heat and pressure until the cement has set somewhat and some of the free moisture has been driven off, placing the material while still hot in a drier at substantially atmospheric pressure and allowing it to remain until more of the free moisture has been expelled, the right amount of moisture will be extracted from the panel. The step may be performed if preferred in a chamber drier. In a mechanical drier, the entire surface is subjected to a large volume of heated air under humidity conditions which can be exactly controlled so that no portion of the outer surface of the wood will be allowed to get below the fiber saturation point. If this is allowed "case hardening" occurs which injures the final product.

When the panels are taken out of the plate presses, they are piled in high stacks and remain in highly heated condition for an hour or more which tends to equalize the distribution of moisture and helps to produce uniform results. This is important where the panels are pressed in groups, because those panels which are next to the plates are drier than those which are in the center of the group, and the edges of the panels are apt to be drier than the centers. The panels are preferably fed into the dryer before they have cooled so that they do not have to be heated again in the drier. The drier is operated so that none of the panels and no portion of the individual panels as they emerge will have a moisture content of less than twenty-five (25) per cent., and so that no checking or warping is apparent, these being certain signs that too much moisture has been removed or that it has been removed too rapidly. Since the drying is stopped short of the fiber saturation point, shrinkage has not begun and the fibers are still limp and flexible.

Up to this point, there has been described the removal of a part but not of the whole of the free moisture, and the methods of removal which have been found most satisfactory in actual practice have been mentioned, but the invention viewed in its broadest aspect is not limited to the removal of the free moisture by the methods described since other methods may perhaps be employed.

The last step is called "repressing" and is the final pressing of the panel between heated plates to remove the remainder of the free moisture and that portion of the fiber saturation moisture which is to be removed and to compress the structure and set the fibers and adhesives. For this step, the combined action of moisture, heat and pressure is essential. The pressure must be applied perpendicularly to the surface of the panels and in sufficient amount to induce an increased radial shrinkage and to resist tangential shrinkage. The fiber saturation moisture is sufficient to render the fibers plastic when heated, but a small amount of free moisture left in the wood after the previous steps of the treatment is not detrimental. With cottonwood the heat should be sufficient to produce a temperature of at least 212° in the wood so that the moisture is converted into steam. The steam softens the wood fibers and expedites the dissipation of the moisture. In practice, it is found desirable to heat the plates of the press with steam under from thirty to forty-five pounds pressure. If low temperatures are used, the dissipation of the moisture is too slow and an undesirable amount of radial shrinkage occurs so that the panels are made too thin; if too high temperatures are used, there is a tendency to dissipate the moisture before a complete substitution of radial or tangential shrinkage can occur. With different woods, the conditions of heat and pressure will vary, but for each kind of wood a combination of heat and pressure can easily be found which will give the most satisfactory results. Repressing is continued until all the remaining free moisture is removed and a portion of the fiber saturation moisture. Preferably, the process is continued until the completed product will show a total moisture content of from eight (8) to twelve (12) per cent., this being the best degree of dryness for commercial use. With black cottonwood under the conditions above mentioned, and with the pressures which we have employed, it is found that the duration of repressing should be about three and one-half minutes for each pound of moisture to be removed per panel; thus, for a quarter inch panel weighing twelve (12) pounds when dry and containing three (3) pounds of moisture to be removed by repressing, the repressing will occupy about ten and one-half minutes.

The hydraulic pressure to which the panels are subjected in the press, prevents tangential shrinkage and the attendant disadvantages and losses. Since the frictional resistance to tangential shrinkage produced by the heavy pressure to which the panel is subjected is enormous, the collapse of the cell walls which accompanies drying can occur only in one direction and only radial shrinkage can take place. Consequently, there is no observable tangential shrinkage, and the strains which it produces do not seem to be present. The final pressing gives a permanent set to the fibers which tends to maintain the panel in flat condition and to resist warping and gives to panels made by this process characteristics altogether different from those of panels made by other processes. The radial contraction increases the density of the wood, and its strength, resilience and resonance are also increased to a marked degree. The dense surface "sands" more smoothly and the beauty of the grain of the finished panel is enhanced.

It will be understood that the prevention of tangential shrinkage increases the radial shrinkage, but this is easily compensated for and finally subjecting it to heat and pressure until all the free moisture and part of the fiber saturation moisture has been driven off.

11. The method of making plywood which includes subjecting the plywood which has been assembled from plies of wet veneer spread with cement to heat and pressure until the cement has set somewhat and some of the free moisture has been driven off, then drying out more of the free moisture at substantially atmospheric pressure and under conditions as to temperature and moisture which will not drive off any of the fiber saturation moisture, and finally subjecting it to heat and pressure until all of the free moisture and part of the fiber saturation moisture has been driven off.

12. The method of making plywood which includes subjecting the plywood which has been assembled from plies of wet veneer spread with cement to a temperature of more than 212° Fahr. and to a pressure greater than that due to the heat until the cement has set somewhat and some of the free moisture has been driven off, then drying out more of the free moisture at substantially atmospheric pressure and under conditions as to temperature and moisture which will not drive off any of the fiber saturation moisture, and then again subjecting it to a temperature of more than 212° Fahr. and a pressure greater than that due to the heat until all the free moisture and part of the fiber saturation moisture has been driven off.

In testimony whereof we affix our signatures.

ARTHUR N. HOOD.
JOHN T. NIGHTINGALE.
FRANK R. LELAND.
THEODORE W. DIKE.